Aug. 23, 1966  D. ATLAS  3,268,892

WEATHER RADAR STORM COURSE DISPLAY

Filed July 14, 1964  3 Sheets-Sheet 1

INVENTOR.
DAVID ATLAS

INVENTOR.
DAVID ATLAS

United States Patent Office 3,268,892
Patented August 23, 1966

3,268,892
WEATHER RADAR STORM COURSE DISPLAY
David Atlas, 828 Chestnut St., Newton, Mass. 02168
Filed July 14, 1964, Ser. No. 382,676
10 Claims. (Cl. 343—5)

The invention described herein may be manufactured and used by or for the United States Government for governmental purposes without payment to me of any royalty thereon.

This invention relates to the display of the course of storms and, more particularly, to recording the movement of only certain selected representative elements of a storm, for more accurate indication of a given storm's characteristics.

The principle of the present method is simply to take a series of two or more exposures of the positions of a storm cell on one storage medium (photographic film, electronic storage tube, or other) at determined intervals. With small echoes such as aircraft or small storm cells, the track of the echo is displayed on the read-out surface (film for example). In most storm situations, however, the echoes cover a large area. Thus, consecutive exposures on one storage surface cause the echoes to overlap one another, thereby resulting in one large echo mass on the final read-out. The present device overcomes this difficulty by recording only the position of one well-defined portion of the storm during each pulse period. Two alternatives will be described: (1) a method which displays either the leading edge (nearest the radar), the trailing edge, or both edges of the storm echo; (2) a method which displays only the position of maximum echo intensity. In either case, as the antenna rotates, the position of the selected feature is plotted as a function of rotation angle, either azimuth in the case of PPI display or elevation in the case of RHI display. For a storm covering a large area, the leading or trailing boundary, or both, of the entire storm is displayed in alternative (1), while the axis of maximum intensity is displayed in alternative (2).

The display of the axis of maximum intensity is preferred to the use of boundary elements, for the position of the storm cores are more likely to be conserved during the storm's life than are the storm's boundaries. Furthermore, radar detection of storm boundaries is very sensitive to the range of the storm with respect to the radar. Thus, as a storm approaches the radar, particles that were previously undetectable in the boundary region became detectable, creating the impression that the storm is approaching more rapidly than is actually the case for the boundary that is moving at a speed greater than the storm core.

Once a portion of the course of a storm has been obtained on the read-out surface the direction and velocity of the storm can be readily determined. Velocity measurements are particularly important in hurricane detection and tracking for two reasons: (1) velocity plots of small echoes circulating around the wall clouds of the eye provide an unmistakable *location* of the eye especially where the wall cloud is but a partial circle; velocity measurements provide a quantitative indication of intensification or decay of a hurricane. Additionally, velocity measurements present information concerning the winds upon which a diagnosis and prognosis of the future course of a storm can be predicated.

Therefore an object of this invention is to provide method and means for determining the course of storms.

Another object of this invention is to provide means for measuring the velocity of storm elements.

Another object of this invention is to plot or record the movement of certain key elements of a storm, such as the central core, the leading edge, the trailing edge, or a combination of these.

Other objects and features of this invention will become more apparent by reference to the following description when taken in conjunction with the accompanying drawings in which.

Figure 1:
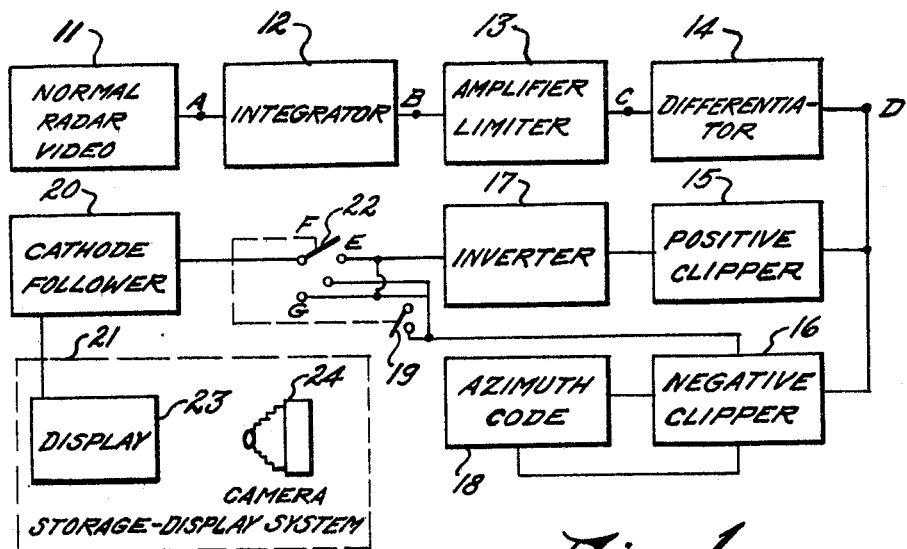
FIGURE 1 is a basic circuit for mapping the movement of the boundary of elements of storms.
Figure 2:
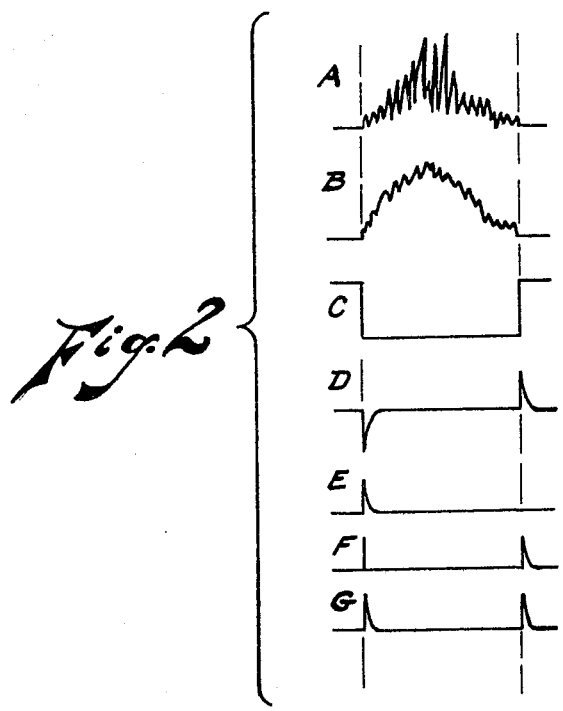
FIGURE 2 is a series of curves showing voltage and pulse patterns at various points in FIGURE 1.

FIGURE 1 illustrates the boundary plotting system, alternative 1. Only a block diagram is shown there since each block is comprised of well known circuitry. The normal radar video comes from block 11, with output signal waveform at point A. This shows the echoes from precipitation as displayed on a single A-scope trace. Because the echoes from precipitation are incoherent and the echo amplitude from one range element (half pulse length in space) is completely independent of the amplitude in adjacent range elements, only the average signal over a number of range elements is meteorologically significant. For this reason, the raw video waveform A is passed through a conventional integrator 12 with output shown by waveform B. The time constant of integrator 12 should be equal to or greater than several radar pulse widths in order to provide sufficient smoothing, but should not be so great as to cause excessive lengthening of the trailing edge of the storm signal. In may applications, integrator 12 may be eliminated. The result will be a somewhat rougher appearing leading or trailing edge. Amplifier limiter 13 strongly amplifies, inverts, and limits the signal as soon as the amplitude at B exceeds a preset threshold, usually set just above the noise level. Differentiator 14 then provides a sharp pulse (D) at both the leading and trailing edge of the storm signal. The positive "D" pulse is clipped by clipper 15. The negative "D" pulse, representing the leading edge of the storm, is then made positive by inverter 17 and appears at terminal E of switch 22, while the positive "D" pulse, representing the trailing edge of the storm, is passed through clipper 16 and appears at terminal F of switch 22. If both the leading and trailing edges of the storm are to be displayed, switch 22 is thrown to terminal G and ganged switch 19 assures that both pulses appear on that terminal. The pulses to be displayed then go to the storage display system 21 via cathode follower 20.

In order to differentiate the leading and trailing edge contours from each other, use may be made of optional azimuth coder 18 which modulates the trailing edge contour in azimuth (or elevation on an RHI display) in accord with a preset code.

The simplest form of storage and display system is an ordinary PPI or RHI scope viewed by a Polaroid camera. A sequence of exposures made on the same film at preset intervals will then show the sequential positions of either the trailing or leading edges (or both) and provide an immediate measure of the storm's velocity. Obviously, an electronic storage display tube may be substituted, thus eliminating the need for the camera and costly film.

Figure 3:
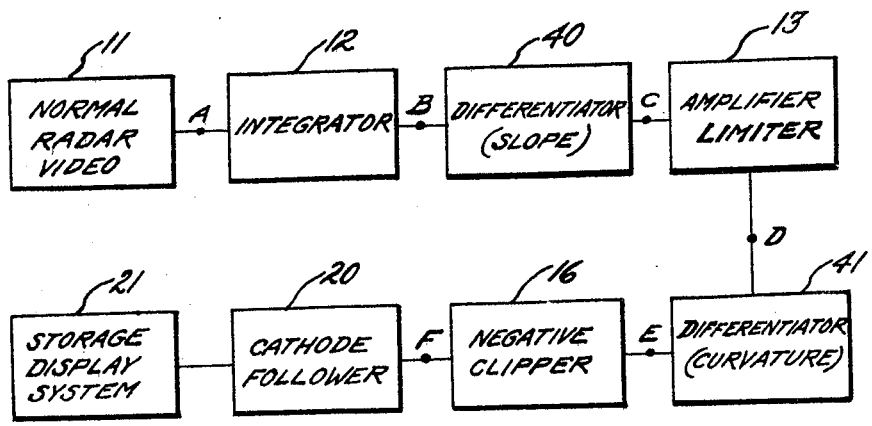
FIGURE 3 is a basic circuit for mapping the movement of the axis of maximum intensity of a storm.
Figure 6:
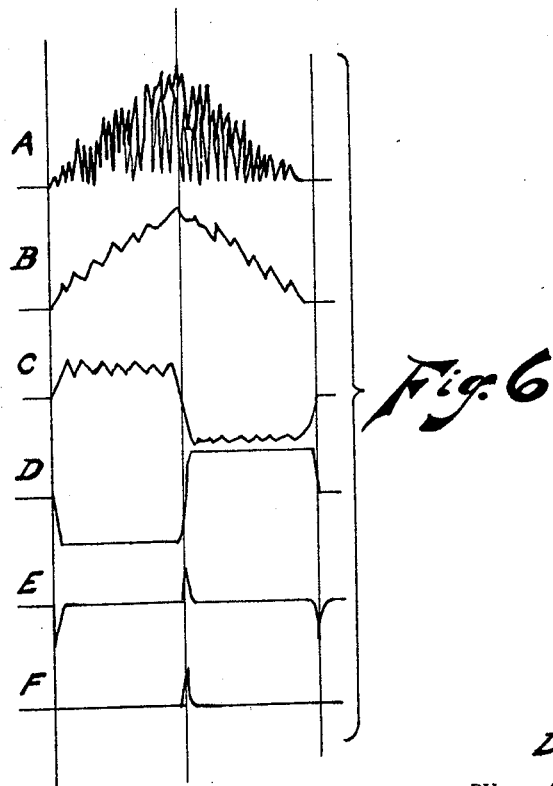
FIGURE 6 is a series of curves identifying various points in FIGURE 5.

Alternative 2, the storm peak mapping system, is illustrated in FIGS. 3 and 6. Here integrator 12 is identical to that in FIG. 1 and performs the same function, smoothing the noise-like precipitation echo to provide a more truly representative variation of echo intensity with range (waveform B) than is present in the raw video (waveform A). In this case, integrator 12 is a required component. Waveform B is then differentiated in differentiator 40 whose output, waveform C, provides a measure of the variation of slope of the echo intensity plot. In order to provide complete and independent control of the time constants of intergrator 12 and differentiator 40 without interaction, a cathode follower may be used to isolate these components from each other. In order to eliminate the effects of the minor ripples on waveform C, amplifier limiter 13 squares and inverts waveform C, producing waveform D. The latter is differentiated by differentiator 41 which provides negative pulses at points of positive curvature and positive pulses at points of negative curvature of waveform B, as shown by waveform E. The point of maximum intensity is thus represented by the positive pulse which is the only one passed to the storage display system 21 by negative clipper 16 and cathode follower 20. As the antenna scans in azimuth (or elevation) the storage display system will therefore plot out the locus of maximum intensity of each and every storm cell on the PPI (or RHI) scope. Velocities of the storms are then obtained as in "alternative 1" by taking sequential exposures at preset intervals.

Figure 5:
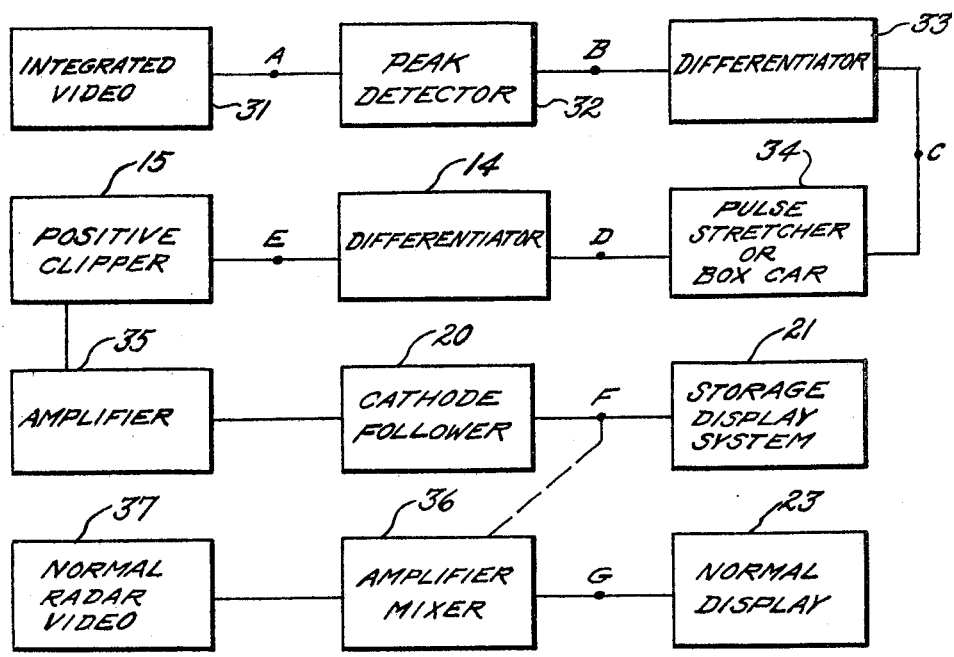
FIGURE 5 is a second circuit whereby the movement of the axis of maximum intensity of a storm can be determined.
Figure 4:
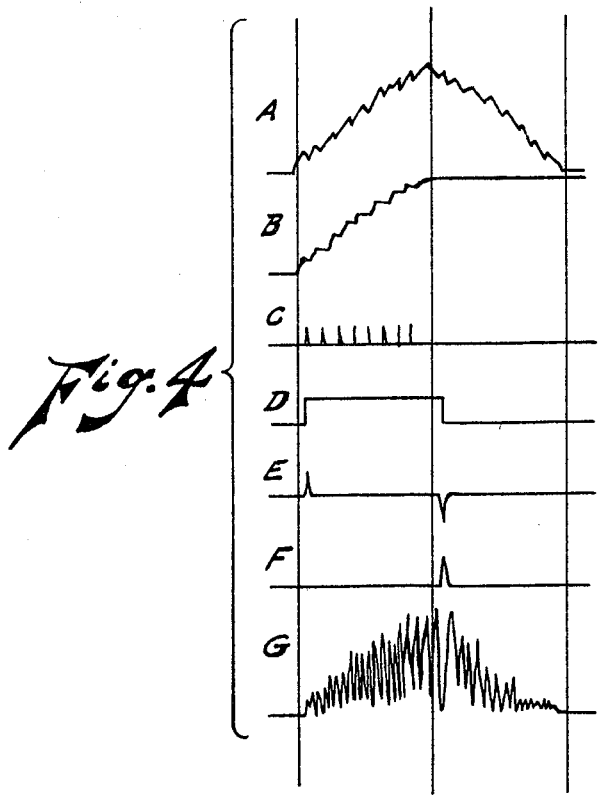
FIGURE 4 is a series of curves showing voltage and pulse patterns at various points in FIGURE 3.

There are various alternative circuits to perform the function of plotting the position of the storm echo maximum. Another circuit is shown in FIG. 5. Here the integrated video A is passed to peak detector 32 producing the stepped waveform B (FIG. A) with each step representing the level of the maximum signal within a one mile (10 microsecond interval) for example. The purpose of this peak detector circuit is to eliminate the negative slope high frequency ripple on the output of integrator 31 which might produce a negative going signal out of differentiator 33 before the true echo maximum is reached. Waveform B is then differentiated by circuit 33, whose output pulses are stretched (or box carred) by circuit 34 to produce waveform D (FIG. 4). The latter is differentiated at 14 (FIG. 5), producing waveform E. After positive clipping at 15, the negative pulse, representing the echo intensity maximum, is amplified and inverted at 35, producing waveform F, and is sent to the storage display system 21 via cathode follower 20.

In FIGS. 3 and 5, it is implicit that the normal radar video input is unlimited. This would be the case if the receiver were logarithmic. If the radar receiver is of any type which limits on strong signals, either the integrated video or normal video may be used in a feedback loop to control the receiver gain and prevent limiting.

A major advantage of the present circuitry over conventional contour mapping circuits is that it displays the signal maximum independent of the intensity level of the maximum. In other words, it displays the point at which the signal goes from a positive slope to a negative one whereas conventional contour mappers require the signal to exceed a present threshold level.

In some applications, it is desirable to record the position of the signal maximum with respect to the entire storm pattern. This is especially useful in time lapse recording of storm areas either on the PPI or RHI scopes in order to follow the metamorphosis of the entire storm while retaining the exact location of the maximum. On an RHI display this would show the internal growth and movement of the storm core, an extremely important feature in interpreting the storm's physical behavior.

A simple circuit to accomplish this is indicated by the dashed portion of FIG. 5. The same circuit may be obviously be incorporated in FIG. 3. In FIG. 5, the pulse representing the signal maximum is amplified and mixed with the normal video in amplifier-limiter 36 in such a manner that the output signal G is positive everywhere except at the position of the peak signal where it is negative. In this way, a sharp hole appears in the PPI or RHI display of the storm at the position of the peak regardless of the signal level.

The circuits described herein may be utilized to locate and plot the position of the boundaries or the peak (or peaks) of any waveform whether they be radar signals or others.

The most unique feature of the system is a means of plotting the position of the peak independent of the signal intensity at the peak. By eliminating all other echoes, sequential exposures of the locus of peak echo intensity permit the automatic display of storm echo velocities.

I claim:

1. The system of mapping the boundary of a radar storm echo comprising means of obtaining signals corresponding to its near edge, means of obtaining signals corresponding to its distant edge, and means of displaying alternatively the near-edge signals, the far-edge signals, or both.

2. The system in claim 1 wherein the said storm echo boundaries corresponding to the storm position at a sequence of times are stored on a storage medium and displayed simultaneously to provide a measure of the storm velocity.

3. The system of mapping the position of maximum intensity of a radar storm echo utilizing normal radar video return signals comprising means of obtaining signals corresponding to the peak, irrespective of its intensity means for mixing said signals corresponding to said peak with said normal video radar return echoes to provide a positive signal everywhere except at the position of said peak signal where it is negative, and means of displaying said mixed signal to provide a visual presentation wherein the storm appears as a sharp hole at the position of said peak.

4. The system of claim 3 wherein said peak signals corresponding to the storm position at a sequence of times are stored on a storage medium and displayed simultaneously to provide a measure of the storm velocity.

5. The system of mapping the position of maximum intensity of a radar storm echo utilizing video return signals from said storm comprising means to integrate said video return signals to provide a representative variation of echo intensity with range, first means to differentiate said integrated pulses to provide a measure of the variation of slope of the echo intensity, means to square the output signal of said first differentiator means, second means to differentiate said squared signal to provide negative pulses at points of positive curvature of said integrated signal and positive pulses at points of negative curvature of said integrated signals, the point of maximum intensity being represented by said positive pulse, means to display only said positive pulse, said display means plotting out the locus of maximum intensity of said storm.

6. The system of mapping the position of maximum intensity of a radar storm as defined in claim 5 further including means of taking sequential exposures of said display at preselected intervals to provide a measure of velocity of said storm.

7. A system of mapping the boundary of a radar storm echo utilizing normal radar video return signals from said storm comprising means to generate pulses representative of the leading edge and pulses representative of the trailing edge of said storm from said normal radar video return signals, and means to distinguish the pulses representative of said leading edge from the pulses representative of said trailing edge, said pulses representative of said leading and trailing edges providing a contour of said leading and trailing edges, respectively, and means to display said contours.

8. A system of mapping the boundary of a radar storm echo as defined in claim 7 including means to record the sequential positions of said contours during the movement of said storm to provide an immediate measure of the velocity of said storm.

9. A system of plotting the position of a storm radar echo maximum utilizing normal radar video return signals from said storm comprising first means to integrate said normal radar video return signals, means to peak detect said integrated signals to eliminate the negative slope high frequency ripple therefrom, first means to differentiate said peak detected signals, means to stretch said differentiated signals, second means to differentiate said stretched signals, means to positively clip said second differentiated signals, to provide only negative pulses being representative of the echo intensity maximum, means to amplify and insert said negative pulses, and means to display said amplified and inverted negative pulses.

10. A system of plotting the position of a storm as defined in claim 9 further including means for mixing said normal radar video return signals with said amplified and inverted signal to provide an output signal being positive everywhere except at the position of the maximum signal where it is negative, and means to display said mixed signal.

References Cited by the Examiner
UNITED STATES PATENTS

| | | | |
|---|---|---|---|
| 2,557,869 | 6/1951 | Gloess | 343—11 |
| 2,972,741 | 2/1961 | Hammond | 343—5 |

CHESTER L. JUSTUS, *Primary Examiner.*

R. D. BENNETT, *Assistant Examiner.*